June 7, 1960 G. B. LEWIS 2,939,366
PYROTECHNIC SHIELD FOR A VEHICLE WITH A VULNERABLE OPENING
Filed May 28, 1957 2 Sheets-Sheet 1

INVENTOR.
GRIFFITH B. LEWIS
BY
John P. Murphy
ATTORNEY

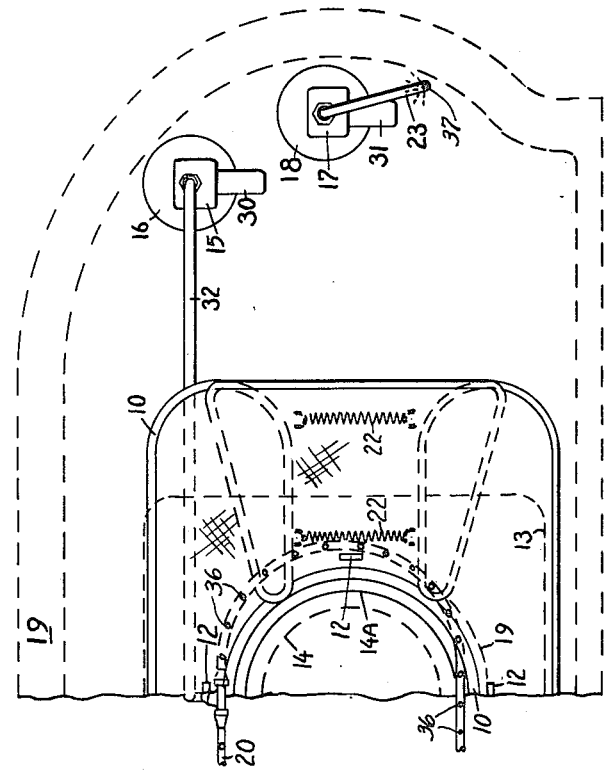
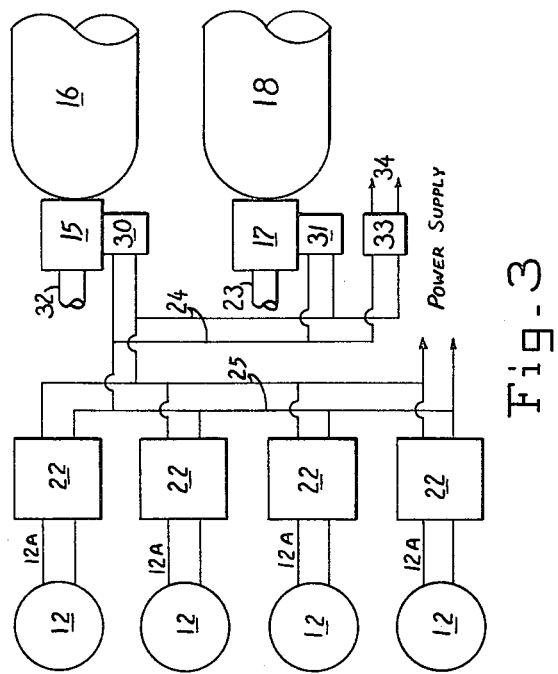

United States Patent Office 2,939,366
Patented June 7, 1960

2,939,366

PYROTECHNIC SHIELD FOR A VEHICLE WITH A VULNERABLE OPENING

Griffith Bertrand Lewis, Colonie, N.Y., assignor to The Barlow Manufacturing Company, New York, N.Y., a partnership Filed May 28, 1957, Ser. No. 662,180

7 Claims. (Cl. 89—36)

This invention relates to military armored units, and more particularly to protective shields for armored tanks having armored surfaces and vulnerable apertures therethrough.

Heretofore, many ways have been proposed to decrease the projectile-penetration of armor plates, to decrease the penetration and effect of flame-throwers and the like on such vehicles, such as tanks and the like, and to protect any apertures subject to such destruction. Although the fabric structures of such shields were made from specially knitted wire and the like, adapted to be fashioned and formed into a wide variety of units, having openings or marginal contours as required, to be used alone or as parts of larger structures and highly resistant to destruction under heavy duty conditions, they have proved to be ineffective against such weapons as flamethrowers. In all such instances, no efforts have been successful to modify or completely reduce the effects of a projectile explosion itself with respect to flame damage. Furthermore, in the operation of such vehicles, serious problems have arisen due to the fact that during combat or attack by flamethrowers, any apertures in such tanks become vulnerable to the flame throwing liquids. As a result, these apertures provide a means of entrance of flame throwing liquids or jell, which when ignited also consumes the life-giving oxygen from within the tank. Not only is there a loss of equipment, but a serious loss of human life. At the present, shields have offered only limited protection from such hazards and merely to localized areas of the tank.

It is an object of the present invention to provide a protective shield of flame resisting material embodying a novel construction and arrangement for any vulnerable opening in an armored vehicle.

Another important object of this protective shield is to serve to reduce or otherwise prevent the attendant damage ordinarily occasioned by such projectiles and combat.

Another advantageous object of this shield is the provision of means for effectively extinguishing any fire, which may occur as a result of bombs, blasts, and the like, directly at the point of flame.

Still another important feature of this novel shield is the provision of a device which supplies oxygen along with inert gases following a fire at any point on the tank, thus preventing suffocation which likely would result in loss of life.

Another advantage of this pyrotechnic shield is the automatic means provided whereby both the fire extinguishing means and the oxygen supply are automatically actuated by any abnormal degree of heat, thus preventing any possibility of loss of time in their effective operation.

Another object of this invention is to provide a protective shield which will reduce the possibility of any fire from spreading to dangerous parts of the tank such as the engine or the fuel tank, thus preventing further explosions and loss of life.

Still another important feature of the present shield is that it may be easily installed on any type of vehicle and used therewith.

Another important object of this invention is that, in the case that the tank is totally enveloped by flame, the invention reduces the effects of the fire sufficiently for at least several minutes, allowing the crew to escape from the tank.

Other objects and features of the invention will more fully hereinafter, from consideration of the following detailed description when taken with reference to the accompanying drawings. It is to be understood, however, that the drawings illustrate one modification of this invention and are not definitive of the limitations thereto, as disclosed in the appended claims.

In accordance with the present invention, the shield is shown attached to a military tank of the armored type. These tanks generally have an armored turret with at least one gun protruding therethrough. Other apertures are provided in the tank for machine guns, sighting and fire control means. The present embodiment illustrates a pyrotechnic shield placed over the opening for the main armament of such a tank. To the shield is fastened a plurality of thermo plugs which are sensitive to a high degree of heat such as from a flame. Each of the several thermo plugs is wired directly to a relay panel which in turn is adapted to actuate its own spray of fire-extinguishing fluid to the point of flame indicated by the particular thermo plug. This fluid may most conveniently be carbon dioxide. It is thus seen, that by placing these thermo plugs at various positions in the tank, all areas therearound may be protected.

It is well known that the most effective way to stop an armored tank or like vehicle is to cause a fire or explosion within the interior of the tank. Therefore, when a pyrotechnic device is directed toward any opening in such a vehicle which is protected in accordance with the present invention, a thermo plug actuated by the increase of heat causes a flame-smothering spray of carbon dioxide or like fluid to be directed to the area of attack. Additionally, a supply of oxygen along with inert gases is automatically released in the interior of the tank for breathing purposes to replace that oxygen consumed by the flames.

Also, when the system goes into effect, a relay common to all heat sensitive areas shuts off all fans and blowers in the ventilation system of the tank, preventing flames from being sucked into the interior of the tank. It is seen that such means effectively reduces the hazards of explosion of fuel supply or ammunition, or suffocation of personnel within the tank.

In the drawings:

Figure 2 is an end view partly in section from within the turret showing the disposition of the shield around the opening and diagrammatically illustrating to further extent the features of the invention.

Figure 3 is a schematic drawing of the circuits in accordance with one modification of the invention.

Figure 1:
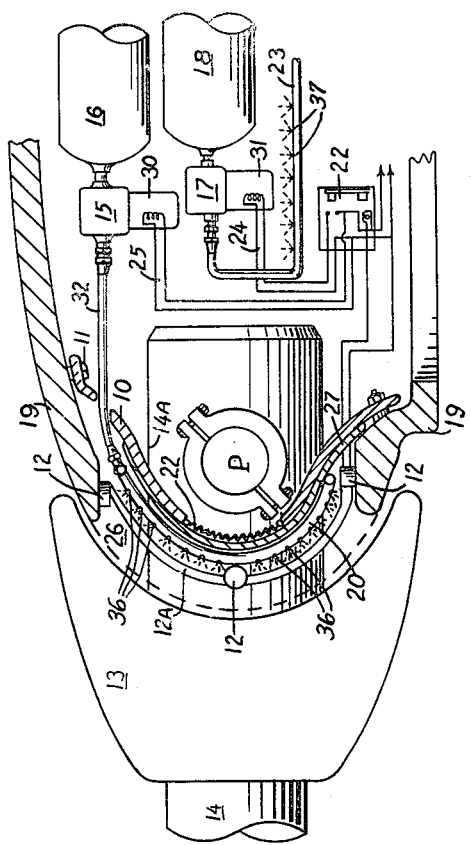
Figure 1 is a diagrammatic side elevation of an armored turret in part, partly in section illustrating the disposition of a shield in accordance with this invention.

With reference to Figure 1, a pyrotechnic shield 10 is disposed around the portion 14A of gun 14 and adapted to cover the opening in turret 19 and be disposed just within this opening, designated at 26. The shield is securely fastened at its periphery to the inside of turret 19 by means of suitable bolts 11 or the like. Springs 22 serve to further secure the shield 10 closely around the portion 14A of gun 14. It is seen that the opening 26 is effectively covered by the shield 10. It is well known in the art that a projectile striking the armored shield 13 of gun 14 is prevented from directly entering the opening 26 in turret 19, yet flames, flaming liquids, and jell from pyrotechnic missiles and attacks are not prevented from entering. The shield 10 effectively prevents such liquids from thus entering the opening 26 and thus spreading to the interior of the tank. The shield 10 may be made from any suitable flame resisting material such as asbestos or other fiber material.

Referring to Figure 2 in conjunction with Figure 1, it is seen that shield 10 has a portion 27 adapted to further cover and shield the sides of the opening 26 and adapted to snugly fit around the portion 14A of gun 14. A carbon dioxide distribution system 20 comprising a perforated pipe or tubing assembly is disposed within opening 26 between the shield 10 and the armored shield 13, and is adapted to spray or otherwise disperse a suitable firefighting agent such as carbon dioxide between the shield 10 and the shield 13, and into opening 26, through perforations 36 in pipe 20.

In Figures 1 and 2 a carbon dioxide supply tank 16 is connected to a solenoid actuated valve 15 which is adapted to admit carbon dioxide through line 32 to the system 20. A relay or solenoid 30 is connected to a relay panel 22 by wires 25. Thermo plugs 12, connected by wires 12A are disposed at strategic points around the opening 26 and connected to relay panel 22 by wires 12A. Relay panel 22 is in turn connected by wires 25 to solenoid 30 for actuating valve 15. Wires 24 are connected to a solenoid 31 adapted to actuate valve 17. A supply tank 18 of oxygen along with inert gases is attached to valve 17 which is adapted to disperse this oxygen along with the inert gases through a series of perforations 37 in the distribution system 23 which is located within the interior of the tank. In the event of a pyrotechnic attack, oxygen along with inert gases is thus dispersed within the tank immediately upon actuation of solenoid 31 by the thermo plugs 12. This reduces the hazards of suffocation of the crew, enabling the crew to have sufficient life-giving oxygen to breathe either following the fire or for the duration of the fire or during an escape attempt from the tank.

The oxygen supply may also be shut off and turned on manually should fire reach the interior of the tank so that the oxygen would not serve to feed the flames and aid the fire.

In the operation of this invention, when a pyrotechnic missile strikes a tank protected according to this invention, or the tank is attacked by a flame thrower, it is well known that flaming liquids or jell are forced toward any vulnerable opening 26. Upon the sudden extreme rise in temperature due to the heat generated by the flames, thermo plugs 12 located at the point of origin of the flames, react the same as a thermostatic device and close a circuit in wires 12A connected to relay panel 22. A switch in relay panel 22 in turn closes the circuit from the power supply (not shown) to the solenoid 30 through wires 25. Solenoid 30 opens valve 15, causing fire-fighting fluids to be directed through the pipe into the distribution system 20, and by means of perforations 36 in the system 20 to be directed against the flames, thus effectively smothering the flames and extinguishing the fire. Simultaneously, the relay panel 22 closes a circuit from the power supply (not shown) through wires 24 to solenoid 31 which opens valve 17. Oxygen along with inert gases is thus admitted from tank 18 into distribution system 23 and dispersed through perforations 37 into the interior of the tank. It being well known that pyrotechnic missiles quickly consume large amounts of oxygen due to the intensity of the flames from such missiles, this oxygen is life-giving to the crew in that it effectively reduces the hazard of suffocation. When the fire is extinguished, the circuits may then be opened and the solenoids 30 and 31 close valves 15 and 17 respectively, thus shutting off the carbon dioxide to the opening 26 and the oxygen to the interior of the tank.

It is to be understood that the thermo plugs 12 and the wires 12A and the relay panel 22 operating solenoids 30 and 31, wired as illustrated in Figure 1 may be wired in a manner illustrated by Figure 3, showing a preferred modification. In Figure 3, thermo plugs 12, four being shown, are representative of thermo plugs placed at each vulnerable opening in a vehicle vulnerable to being entered by flames. In this modification, each separate opening has its own relay panel 22. It is understood that the wires 25 actuating the solenoid 30 are common to all relays 22. Solenoid 33 is illustrated as also connected to wires 24 which are connected to wires 25 as hereinabove described. This solenoid 33 has wires 34 leading to the power supply for the vehicle's ventilation system (not shown) for the purpose of shutting off this ventilation system in the case of pyrotechnic attack so that flames may not be sucked into the interior of the tank and endanger the crew or the fuel or ammunition.

It is to be understood that various changes may from time to time be made to the apparatus as disclosed which do not depart from the true spirit and scope of the appended claims, and that the inventor is not to be limited to the modification illustrated other than disclosed in the appended claims.

I claim:

1. In a vehicle having a vulnerable opening, in combination a fire resistant shield, a fire extinguishing system, an oxygen supply system for the interior of said vehicle, and automatic actuating means; for actuating said systems said fire resistant shield being disposed in the interior of said opening and fastened securely to the interior of said vehicle and fitting snugly about armament and the like protruding through said opening; said fire extinguishing system comprising a supply tank of fire fighting agent and a distribution system including a perforated pipe disposed in said opening and a valve forming means for admitting fire fighting agent from said tank to said distribution system; said oxygen supply system comprising a supply tank of oxygen and a distribution system including a perforated pipe located in the interior of said vehicle and a valve forming means for admitting oxygen from said tank to said distribution system; said automatic actuating means including thermo plugs adapted for actuating said valves in response to a sudden rise in temperature in said opening.

2. In a vehicle having a vulnerable opening, in combination with a fire resistant shield in said opening and a system actuated by automatic means for extinguishing a fire in said opening; an oxygen supply system for the interior of said vehicle comprising a supply tank of oxygen and a distribution system including a perforated pipe located in the interior of said vehicle and a valve forming a means for admitting oxygen from said tank to said distribution system; said automatic means including thermo plugs in said opening, said valve being actuated by said automatic means for said first system in response to a sudden rise in temperature in said opening.

3. In a vehicle having a vulnerable opening, in combination with a fire resistant shield in said opening and a system for extinguishing a fire in said opening and a system for supplying oxygen to the interior of said vehicle, each said system including a valve; automatic means for actuating said systems comprising a plurality of thermo plugs connected together by wires and placed in said opening, a relay panel connected to said thermo plugs by wires, a solenoid connected to said valves and connected by wires to said relay panel for being actuated thereby for opening and closing said valve in each said system; said thermo plugs actuating said relay panel in response to a sudden rise in tempwerature in said opening, whereby said valves in each said system are opened.

4. A fire resistant shield and a fire extinguishing system and an oxygen supply system and automatic actuating means including thermo plugs in a vulnerable opening for said first system and said second system in combination for a vehicle having said opening; said fire resistant shield being fastened in the interior of said vehicle and effectively covering said opening against a pyrotechnic device directed toward said opening, said automatic actuating system actuating said first system for directing a fire fighting agent into said opening and actuating said second system for supplying oxygen to the interior of said vehicle in response to a sudden rise in temperature in said opening.

5. In a vehicle having a vulnerable opening, in combination a fire resistant shield, a fire extinguishing system, an oxygen supply system for the interior of said vehicle, and automatic actuating means; said fire resistant shield being disposed in the interior of said opening; said fire extinguishing system comprising a supply tank of fire fighting agent and a distribution system including a perforated pipe disposed in said opening and a valve forming a means for admitting fire fighting agent from said tank to said distribution system; said oxygen supply system comprising a supply tank of oxygen and a distribution system including a perforated pipe located in the interior of said vehicle and a valve forming a means for admitting oxygen from said tank to said distribution system; said automatic actuating means comprising a plurality of thermo plugs connected together by wires and placed in said opening, a relay panel connected to said thermo plugs, and a solenoid on each said valve and connected to said relay panel for actuation thereby for opening and closing said valves; said thermo plugs actuating said relay panel in response to a sudden rise in temperature, whereby said valves are opened by said solenoids.

6. A fire resistant shield and a fire extinguishing system for a vehicle having a vulnerable opening, said shield being fastened in the interior of said vehicle for covering said opening, said fire extinguishing system being adapted to direct a fire fighting agent into said opening, an automatic means for actuating said fire extinguishing system in response to a sudden rise in temperature in said opening, said automatic means comprising thermo plugs placed about said opening, a solenoid for operating said fire extinguishing system, and relay means connected to said solenoid for operating said fire extinguishing system in response to actuation by said thermal plugs.

7. The combination according to claim 6, and an oxygen supply system for the interior of said vehicle, said oxygen supply system having a solenoid actuated by said relay means for operating said oxygen supply system, thereby supplying oxygen to the interior of said vehicle in response to a sudden rise in temperature in said opening.

References Cited in the file of this patent

UNITED STATES PATENTS

| | | |
|---|---|---|
| 1,660,269 | Knox et al. | Feb. 21, 1928 |
| 2,023,569 | Allen et al. | Dec. 10, 1935 |
| 2,341,437 | Getz | Feb. 8, 1944 |
| 2,370,148 | Colby | Feb. 27, 1945 |